US011035685B2

(12) United States Patent
Demerly et al.

(10) Patent No.: US 11,035,685 B2
(45) Date of Patent: Jun. 15, 2021

(54) ROUTE PLANNING ALGORITHM FOR EFFICIENTLY SEARCHING THROUGH MEANINGFUL LINKS WITHIN A DEFINED TOPOLOGY

(71) Applicant: ZENUITY AB, Gothenburg (SE)

(72) Inventors: Jon Dee Demerly, Bryon, MI (US); Madhura Gandhi, Farmington Hills, MI (US); Sean Yang, Ann Arbor, MI (US)

(73) Assignee: ZENUITY AB, Gothenburg (SE)

(*) Notice: Subject to any disclaimer, the term of this patent is extended or adjusted under 35 U.S.C. 154(b) by 203 days.

(21) Appl. No.: 16/235,691

(22) Filed: Dec. 28, 2018

(65) Prior Publication Data
US 2020/0209001 A1 Jul. 2, 2020

(51) Int. Cl.
*G01C 21/34* (2006.01)
*G01C 21/20* (2006.01)
(52) U.S. Cl.
CPC ......... *G01C 21/3453* (2013.01); *G01C 21/20* (2013.01)
(58) Field of Classification Search
CPC .............. G01C 21/3453; G01C 21/20; G01C 21/3446; G01C 21/3685
See application file for complete search history.

(56) References Cited

U.S. PATENT DOCUMENTS

| 8,219,314 B2* | 7/2012 | Adachi | G09B 29/106 |
| | | | 701/411 |
| 2014/0052374 A1* | 2/2014 | Hoch | G01C 21/362 |
| | | | 701/533 |
| 2018/0052460 A1* | 2/2018 | Kurt | G08G 1/143 |
| 2019/0120640 A1* | 4/2019 | Ho | G06Q 50/30 |
| 2019/0376795 A1* | 12/2019 | Linder | H04W 4/024 |
| 2020/0018602 A1* | 1/2020 | Beaurepaire | G08G 1/096866 |
| 2020/0160712 A1* | 5/2020 | Beaurepaire | G01C 21/3685 |
| 2020/0182626 A1* | 6/2020 | He | G01C 21/32 |
| 2020/0209010 A1* | 7/2020 | Beaurepaire | G01C 21/3655 |

FOREIGN PATENT DOCUMENTS

| CN | 107560615 A | * | 1/2018 | ............ G01C 21/20 |
| JP | 2006194638 A | * | 7/2006 | ............ G01C 21/00 |

OTHER PUBLICATIONS

English Translation of JP2006194638A.*
English Translation of CN107560615A.*

* cited by examiner

*Primary Examiner* — Rami Khatib
*Assistant Examiner* — Gabriel J Lambert
(74) *Attorney, Agent, or Firm* — Craig A. Phillips; Dickinson Wright PLLC

(57) ABSTRACT

A system and method for identifying a route to a location for a vehicle including generating a topological map of a parking area having a plurality of parking spaces and a plurality of roads. A plurality of nodes are established on the topological map, wherein each of the nodes has latitude and longitudinal coordinates. A plurality of links are established on the topological map. The links each extend between two of the nodes. One of the nodes is established as a starting node at which the vehicle starts and one of the nodes is established as a target node. A route is established to the target node that follows a series of the links to the target node using Dijkstra's algorithm. The route is determined based on a cost associated with each link for purposes of establishing the route with Dijkstra's algorithm.

15 Claims, 5 Drawing Sheets

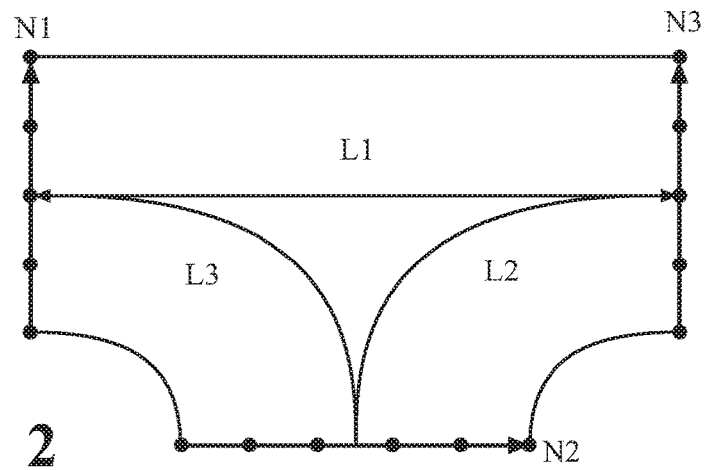
FIG. 2
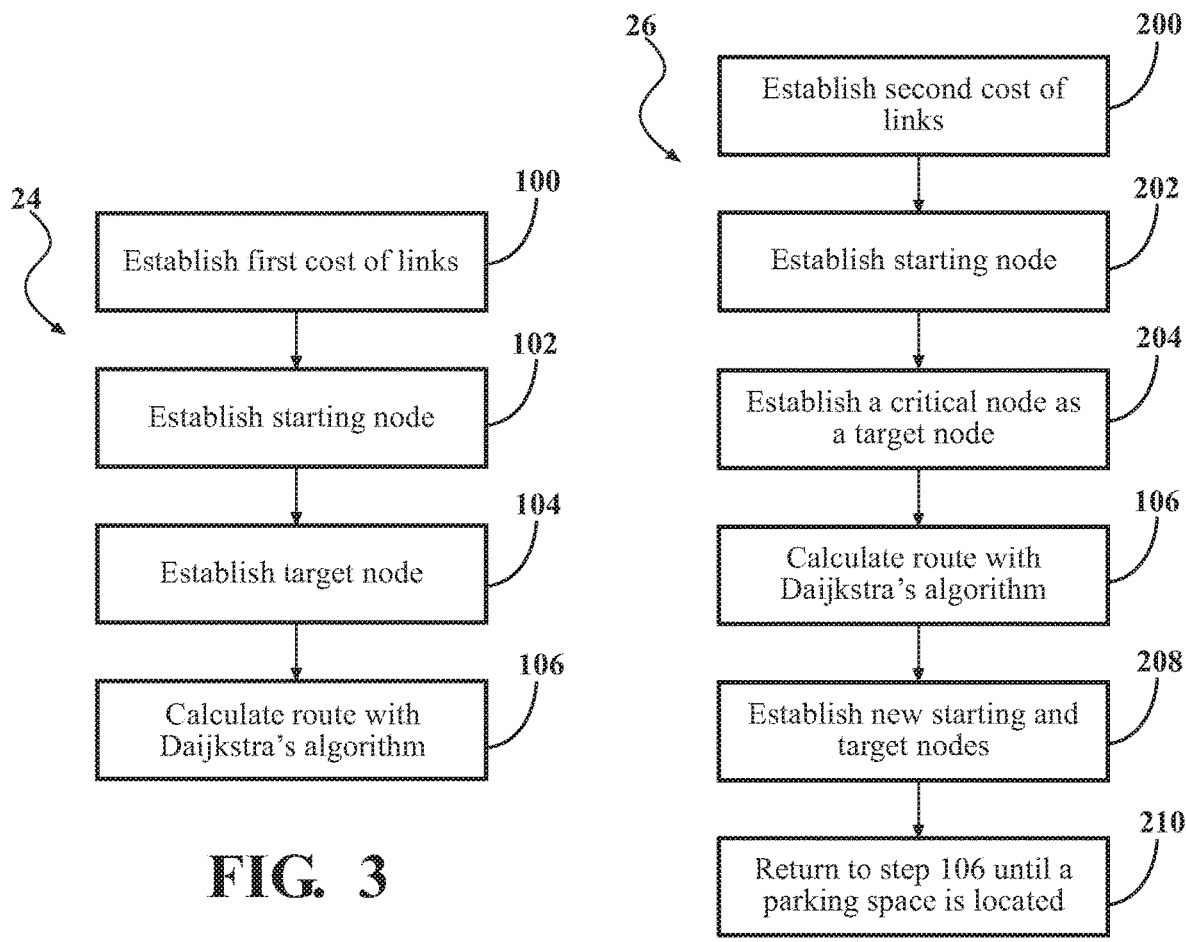
FIG. 3
FIG. 5

ROUTE PLANNING ALGORITHM FOR EFFICIENTLY SEARCHING THROUGH MEANINGFUL LINKS WITHIN A DEFINED TOPOLOGY

FIELD OF THE DISCLOSURE

A system and method for determining a route to a location within a parking area. More particularly, a method for planning a route to a location within a parking area utilizing a new and novel method for efficiently searching through meaningful links within a defined topology.

BACKGROUND OF THE INVENTION

Searching for an empty parking space in a parking area such as a parking lot is a unique routing problem that is not well-defined. Parking areas have many different sizes, shapes, configurations, and are consistently changing as vehicles enter, park, or exit. Drivers generally employ a variety of approaches, for example: 1) choosing a row and selecting a visibly open parking space that is closest to an entrance of a destination, 2) cycling through multiple rows to identify parking spaces that are close to the entrance, or even 3) park away from other vehicles or moveable objects such as shopping carts. Although advances have been made in vehicle navigation systems for both operator-driven and self-driving vehicles to assist drivers in determining an optimal route along roads to a destination, there remains a need to further assist drivers in efficiently identifying open parking spaces within a parking area. Autonomous vehicles, in particular, need to have the capability of executing the task of searching for a parking space in an efficient and well-defined manner.

SUMMARY OF THE INVENTION

It is an objective of the disclosure to provide a system and method for searching for a parking space or other destination in a parking area in an efficient and well-defined manner.

It is another objective of the present disclosure to provide a generalized approach for searching for a parking space or other destination in a parking area that can be applied for different topological maps of parking areas.

According to these and other objectives of the disclosure, a method for identifying a route within a parking area for a vehicle is provided. The method includes generating a topological map of the parking area having a plurality of parking spaces and a plurality of roads or paths extending between and adjacent to the parking spaces. The method also includes establishing a plurality of nodes on the topological map, wherein the nodes are located along the plurality of roads, and wherein each of the nodes has latitude and longitudinal coordinates. The method also includes establishing a plurality of links on the topological map, wherein the links each extend between two of the nodes, and wherein at least one of the links extends along a plurality of the parking spaces. Each of the links has a length determined by the latitude and longitudinal coordinates of the nodes which comprise the link. The method continues with establishing one of the nodes as a starting node at which the vehicle starts and establishing one of the nodes as a target node. The method continues with establishing a route to the target node that follows a series of the links to the target node using Dijkstra's algorithm. A cost associated with each link for purposes of establishing the route with Dijkstra's algorithm is based on the equation:

$$\text{Cost} = \text{Adjacency} + f(\text{LinkLength}/\text{ParkingSpaces})$$

All of the links that have a non-zero number of parking spaces are non-zero links, and the adjacency of each of the non-zero links is zero. Any of the links that have zero parking spaces are zero links, and the adjacency of the zero links is equal to a sum of the number of zero links between the subject zero link and the closest non-zero link. f(LinkLength/ParkingSpaces) for zero links is a predetermined constant, and f(LinkLength/ParkingSpaces) for non-zero links is equal to the length of the link divided by a number of parking spaces that border the link.

According to the above and other objectives of the disclosure, a non-transitory computer-readable storage media storing computer-executable instructions that, when executed by a processor, instruct a device to perform actions including generating a topological map of a parking area having a plurality of parking spaces and a plurality of roads extending between and adjacent to the parking spaces. The actions may further include displaying the topological map on an electronic display. The actions also include establishing a plurality of nodes on the topological map, wherein the nodes are located along the plurality of roads, and wherein each of the nodes has latitude and longitudinal coordinates. The actions also include establishing a plurality of links on the topological map, wherein the links each extend between two of the nodes, and wherein at least one of the links extends along a plurality of the parking spaces. Each of the links has a length determined by the latitude and longitudinal coordinates of the nodes which comprise the link. The actions also include establishing one of the nodes as a starting node at which the vehicle starts and establishing one of the nodes as a target node. The actions also include establishing a route to the target node that follows a series of the links to the target node using Dijkstra's algorithm. A cost associated with each link for purposes of establishing the route with Dijkstra's algorithm is based on the equation:

$$\text{Cost} = \text{Adjacency} + f(\text{LinkLength}/\text{ParkingSpaces})$$

Any of the links that have a non-zero number of parking spaces are non-zero links, and the adjacency of the non-zero links is zero. Any of the links that have zero parking spaces are zero links, and the adjacency of the zero links is equal to a sum of the number of zero links between the subject zero link and the closest non-zero link. f(LinkLength/ParkingSpaces) for zero links is a predetermined constant. f(LinkLength/ParkingSpaces) for non-zero links is equal to the length of the link divided by a number of parking spaces that border the link. The actions further include displaying the established route on the electronic display.

According to the above and other aspects of the disclosure, a method for identifying a parking space for a vehicle is provided. The method includes generating a topological map of a parking area having a plurality of parking spaces and a plurality of roads extending between and adjacent to the parking spaces. The method also includes establishing a plurality of nodes on the topological map, wherein the nodes are located along the plurality of roads. The method also includes establishing a plurality of links on the topological map, wherein the links each extend between two of the nodes, and wherein at least one of the links extends along a plurality of the parking spaces. The method also includes establishing one of the nodes as a starting node at which the vehicle starts and establishing one of the nodes as a target node, wherein the target node is adjacent to predetermined parking space. The method also includes establishing a route to the target node that follows a series of the links to the target node using Dijkstra's algorithm. A cost associated with each link for purposes of establishing the route with Dijkstra's algorithm is equal to a distance between the pair of the nodes that comprise the link, and wherein the distance of each link is generated based on latitude and longitudinal coordinates of the nodes which establish the link.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is an example arrangement of a plurality of nodes and links at the intersection of two roads on a topological map;

FIG. 3 is a flow diagram of a first example method of determining a route to a predetermined parking space or other feature of a parking area;

FIG. 5 is a flow diagram of a second example method of determining a route to a predetermined parking space or other feature of a parking area;

DESCRIPTION OF THE ENABLING EMBODIMENTS

Referring to the Figures, wherein like numerals indicate corresponding parts throughout the several views, a system and methods for establishing a route to a parking space or other feature of a parking area for a vehicle are provided. It should be appreciated that the subject system and methods may be employed for vehicles which are driven by an operator or self-driven. In situations in which the subject system and methods are employed for a vehicle driven by an operator, a generated route can be displayed on a computer generated map. In situations in which the subject system and methods are employed on a self-driven vehicle, the vehicle may be configured to automatically follow routes generated by the subject system and methods and also display the generated route on a computer generated map.

Figure 1:
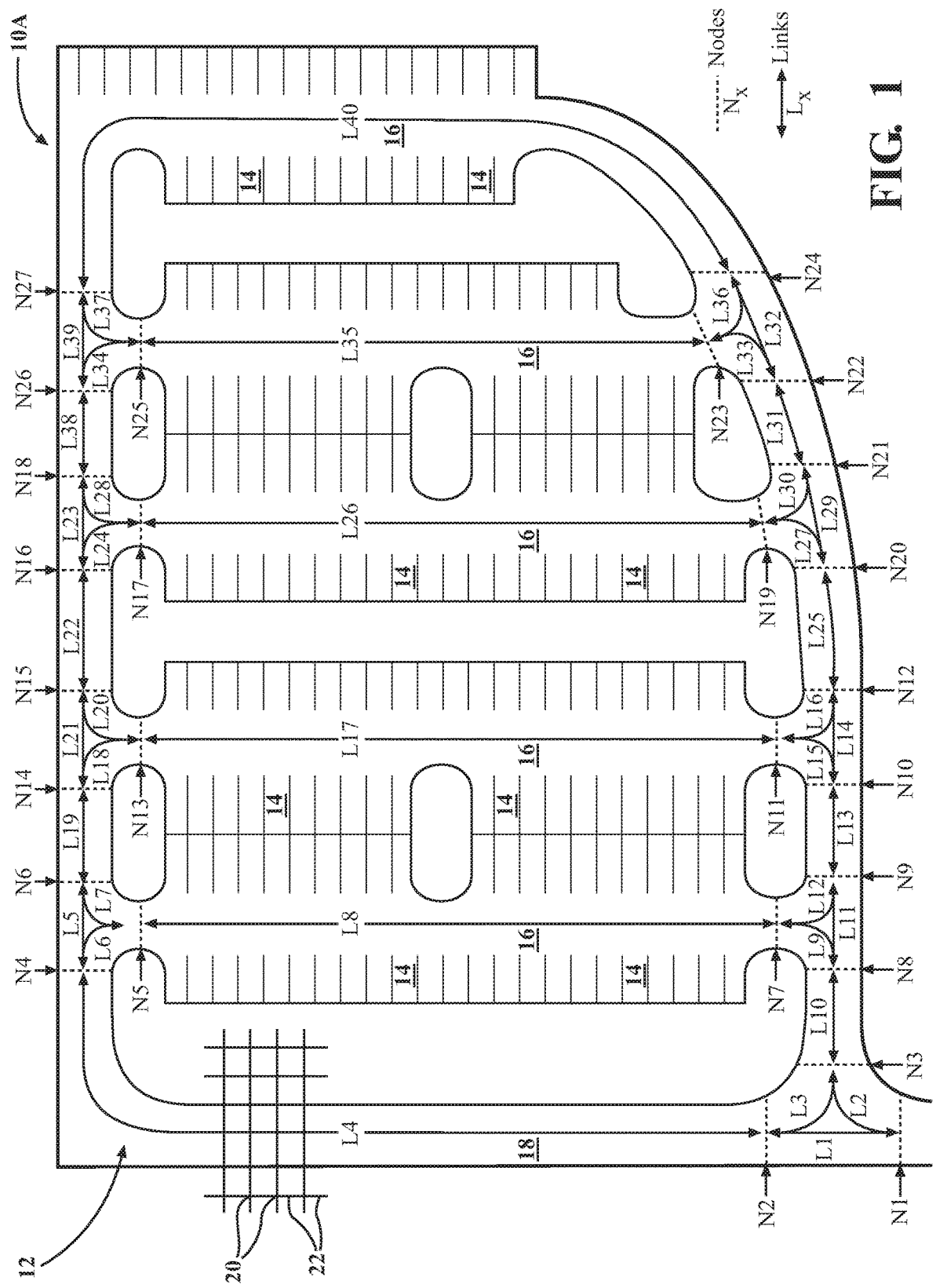
FIG. 1 is a top schematic view of a first example topological map of a parking area including a plurality of links and nodes.

As best shown in FIG. 1, the system includes a topological map 10A that is generated and displayed by a computer and associated display device. The topological map 10A includes a parking area 12, such as a parking lot, with a plurality of parking spaces 14 and a road network 16, 18. It should be appreciated that images of the parking area 12, including specific parking spaces 14 and road networks may be provided by way of satellite images, probe sourcing or other image creating technologies. It should be appreciated that the subject system and methods may be employed for finding parking spaces 14 in various types of parking areas, including but not limited to, traditional parking lots or street parking areas. The road network 16, 18 may include a plurality of rows 16 extending between and bordering the parking spaces 14, and ingress and egress roads 18 that are connected to the rows 16. The topological map 10A is arranged as a graph with a plurality of vertices 20 and a plurality of edges 22. The topological map 10A may be available in a format specified by widely used commercial mapping companies. It should be appreciated that various types of computers may be employed, as would be understood by one of ordinary skill in the art. The computer may include a non-transitory computer-readable storage media storing computer-executable instructions and processor for executing the methods of the subject disclosure.

The computer is further configured to establish a plurality of nodes N1-N24 on the topological map 10A. The nodes N1-N24 are each comprised of one of the vertices 20 of the topological map 10A defined by latitude and longitudinal coordinates obtained by the topological map 10A. The nodes N1-N24 each are assigned a node number (N1-N24). According to the example embodiment, the nodes N1-N24 are each located at one of: where a road lane starts forming, where a forming road lane finishes forming, where a road lane begins merging, where a merging road lane finishes merging, where a road approaches an intersection where multiple vehicle maneuvers are possible from at least one lane of the road bed in either direction, where a link length is greater than two kilometers, or at specific parking spaces. It should be appreciated that the nodes N1-N24 could be located at other areas of the topological map 10A.

The computer is further configured to establish a plurality of links L1-L40 on the topological map 10A. Each of the links L1-L40 extends between two of the nodes N1-N24, and may be defined by edges 22 of the topological map 10A. As shown in FIG. 1, the links L1-L40 may span the length of rows 16 of the parking area, or as shown in FIG. 2, may extend between nodes N1-N40 within an intersection of two or more rows and/or roads. FIG. 2 shows an example of nodes N1-N3 and links L1-L3 at a typical junction. As will be discussed in further detail below, each link L1-L40 has a cost associated with it. The links L1-L40 further represent a particular path that can be driven within the parking area and also serves as a container for path information. Parameters associated with each links L1-L40 may include a start node number, an end node number, a number of parking spaces along the link, a link length, and a direction of travel.

It should be appreciated that the nodes N1-N24 and links L1-L40 may be generated prior to loading the topological map 10A in the vehicle's computer. More particularly, the nodes N1-N24 and links L1-L40 may be pre-programmed into the topological map 10A prior to access of the topological map 10A by the vehicle's computer. Alternatively, the nodes N1-N24 and links L1-L40 may be added to a less developed topological map 10A by the vehicle's computer/cloud server during and/or after loading of the topological map 10A by the vehicle's computer/cloud. Such new, added, information may be shared with other users/maps such as by way of a cloud network.

Figure 4:
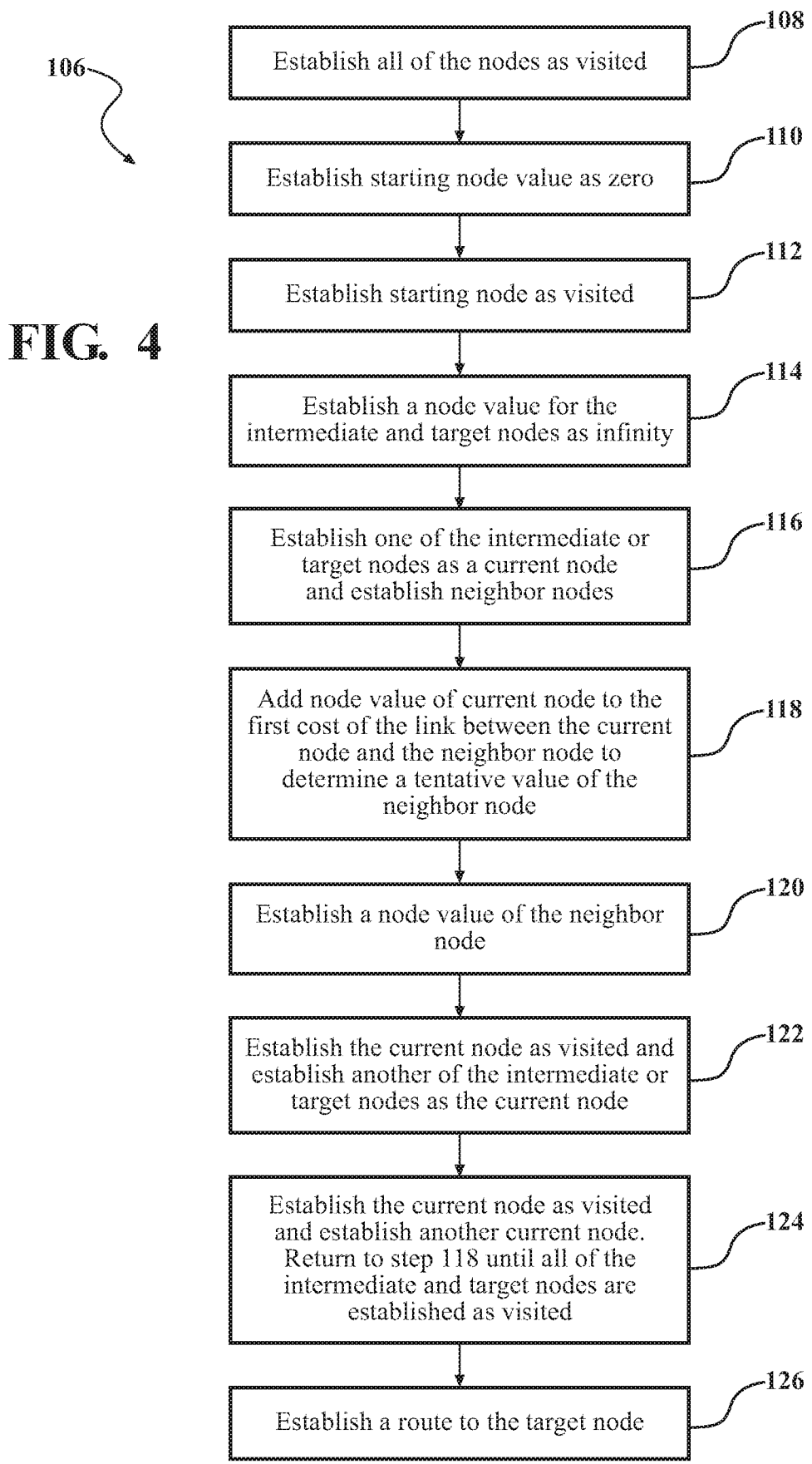
FIG. 4 is a flow diagram of an example method of using Dijkstra's algorithm to determine a route to a predetermined parking space or other feature of a parking space.

As presented in FIGS. 3-5, the subject disclosure includes two methods 24, 26 for optimizing the process of finding a parking space 14, or other feature within a parking area 12 utilizing the aforementioned arrangement of a topological map 10A. The first method 24 determines the most efficient path to a predetermined feature of the parking area 12, such as a parking space 14 or pickup location of a user. The second method 26 determines an optimal route within the parking area 12 for navigating past a maximum number of parking spaces 14. Each method 24, 26 utilizes Dijkstra's algorithm to output a sequence of the links L1-L40 which the vehicle should traverse between a starting node and a targeted node. For purposes of using Dijkstra's algorithm, a cost associated with each link L1-L40 is determined depending on which method 24, 26 is employed.

With reference to FIG. 3, the first method 24 includes the step 100 of establishing a first cost for each of the links for purposes of using Dijkstra's algorithm. According to the first method, the first cost associated with each of the links L1-L40 is equal to a geographical length of each link L1-L40 as determined by the latitude and longitudinal coordinates from the topological map 10A. The method continues with 102 establishing one of the nodes N1-N24 as a starting node from which the vehicle starts, and 104 establishing another of the nodes N1-N24 as a target node at which the vehicle finishes. The method continues with 106 utilizing Dijkstra's algorithm to determine the most efficient path from the starting node to the target node, wherein the first cost is used as the value of each link.

As presented in FIGS. 3-5, the subject disclosure includes two methods 24, 26 for optimizing the process of finding a parking space 14, or other feature within a parking area 12 utilizing the aforementioned arrangement of a topographic map 10A. The first method 24 determines the most efficient path to a predetermined feature of the parking area 12, such as a parking space 14 or pickup location of a user. The second method 26 determines an optimal route within the parking area 12 for navigating past a maximum number of parking spaces 14. Each method 24, 26 utilizes Dijkstra's algorithm to output a sequence of the links L1-L40 which the vehicle should traverse between a starting node and a targeted node. For purposes of using Dijkstra's algorithm, a cost associated with each link L1-L40 is determined depending on which method 24, 26 is employed.

With reference to FIG. 3, the first method 24 includes the step 100 of establishing a first cost for each of the links for purposes of using Dijkstra's algorithm. According to the first method, the first cost associated with each of the links L1-L40 is equal to a geographical length of each link L1-L40 as determined by the latitude and longitudinal coordinates from the topological map 10A. The method continues with 102 establishing one of the nodes N1-N24 as a starting node from which the vehicle starts, and 104 establishing another of the nodes N1-N24 as a target node at which the vehicle finishes. The method continues with 106 utilizing Dijkstra's algorithm to determine the most efficient path from the starting node to the target node, wherein the first cost is used as the value of each link.

FIG. 4 further illustrates the step 106 of utilizing Dijkstra's algorithm to determine the most efficient path to the target node. Step 106 further includes 108 establishing all of the nodes N1-N24 as unvisited. The method continues with 110 establishing a node value for the starting node as zero and 112 declaring the starting node as visited. The method proceeds with 114 establishing a node value of infinity for each of the intermediate nodes and the target node. The method continues with 116 establishing one of the intermediate nodes as a current node and establishing all of the unvisited nodes that are within one link of the current node as neighbor nodes. The method continues with 118, for each of the neighbor nodes, adding the node value of the current node to the cost of the link between the current node and the neighbor node to determine a tentative node value for the neighbor node. The node value for the first current node that is analyzed is equal to the cost of the link between the starting node and the current node. If the tentative node value for the neighbor node is less than the present node value, then the method continues with 120 establishing the node value for the neighbor node as the tentative node value. After all of the neighboring nodes of the current node have been analyzed, the method continues with 122 establishing the current node as visited and establishing another of the intermediate or target node as the current node. The method proceeds by 124 repeating step 118 for the new current node and subsequent intermediate and target nodes until all of the intermediate nodes and the target node have been established as visited. Finally, the method includes 126 establishing a route to the target node that follows a series of the links between nodes to the target node that add to the smallest node values. The established route may be displayed on the topographic map 10A for a driver of a self-driven vehicle to follow and/or may be followed by a self-driven vehicle to the target destination.

With reference to FIG. 5, the second method 26 is similar to the first method 24 except a second cost that is different than the first cost is utilized for each link L1-L40. Utilizing the second cost causes the route to follow links L1-L40 between the starting node and target node that passes a maximum number of the parking spaces 14.

More particularly, similar to the first method, the second method includes the step of 200 establishing a second cost of each of the links. Step 200 of calculating the second cost will be explained in further detail below. The method continues with 202 establishing one of the nodes N1-N24 as a starting node from which the vehicle starts, and 204 establishing another of the nodes N1-N24 as a target node at which the vehicle finishes. Rather than establishing the target node as a predetermined location like a parking space as in the first method 24, the target node is established as one of a plurality of critical nodes. According to the subject embodiment, the critical nodes are each one of the corners of the parking area, however, other nodes N1-N24 may be chosen. The method proceeds with using Dijkstra's algorithm in accordance with step 106 above to determine a path to the target node, except the second cost is utilized for each link (instead of the first cost as in the first method). Once the first target/critical node is reached, the method continues by 208 establishing the first target/critical node as the starting node and establishing another critical node as a target node. The method continues by 210 returning to step 106 of utilizing Dijkstra's algorithm in accordance with step 106 above to determine a path to the target node until an available parking space is found.

With reference back to step 200, the cost associated with each of the links L1-L40 is a second cost which is calculated based on by the following equation.

$$Cost2 = Adjacency + f(LinkLength/ParkingSpaces)$$

For links L1-L40 that have a non-zero number of parking spaces (a non-zero link), the adjacency value is equal to zero. For links L1-L40 that have zero parking spaces (zero links), the adjacency value is equal to a sum of the number of zero links between the subject zero link and the closest non-zero link (including the subject link). For example, a zero link that is directly adjacent to a non-zero link has an adjacency value of one, and a zero links that is one link away from the closest non-zero link has an adjacency value of two.

Furthermore, a function, f(LinkLength/ParkingSpaces), is determined for each of the links L1-L40. For each of the zero links, a first function is employed, which is a predetermined constant. According to the example embodiment, the predetermined constant is 5, however, other numbers may be utilized depending on the specific arrangement of the parking area 12. A second function is utilized for each of the non-zero links. The second function is equal to a link length divided by number of parking spaces. For example, for a non-zero link having a link length of 20 meters and which borders 4 parking spaces, the second function would equal 5. As such, the second cost for the same link is 5 because its adjacency value is 0.

Figure 6A:
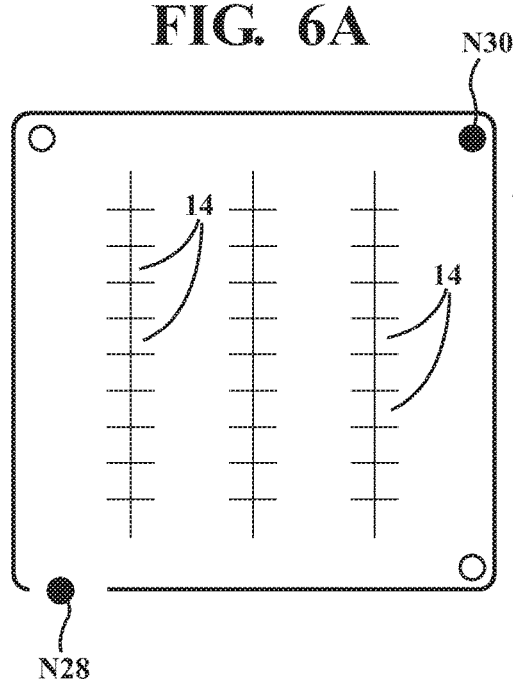
FIGS. 6A-6D are top schematic views of a second example topological map of a parking area illustrating the generation of a route in accordance with the second method.
Figure 6B:
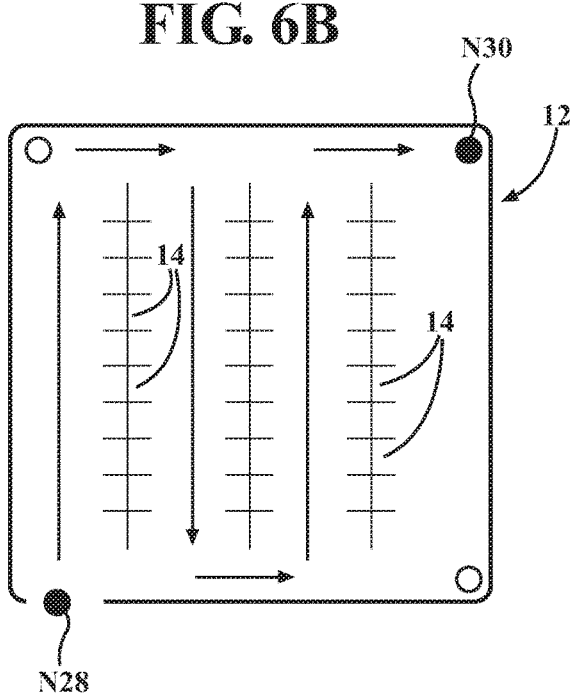
Figure 6C:
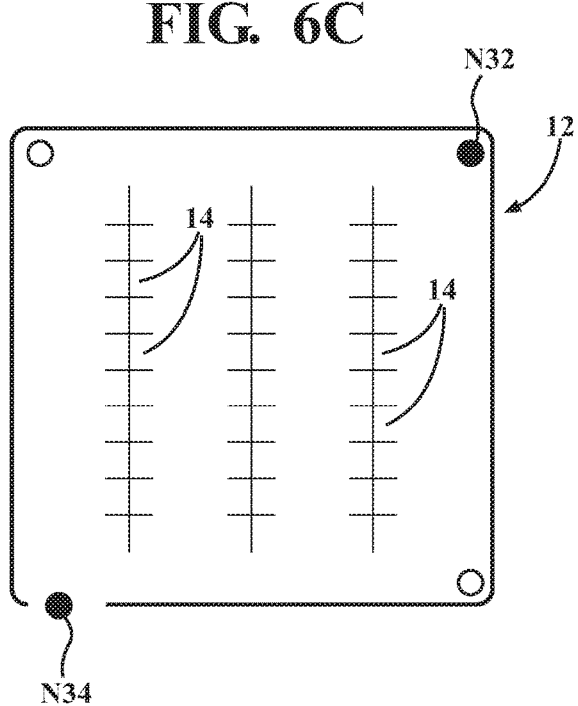
Figure 6D:
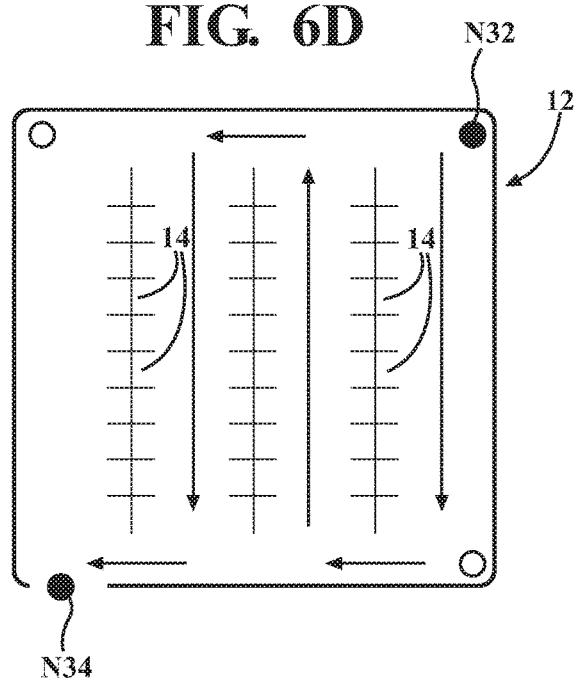

FIGS. 6A-6E graphically illustrate execution of the second method 26. FIG. 6A presents a sample parking area 12 with a starting node N28 and a target node N30. The target node N30 is one of the critical nodes at a corner of the parking area. As shown in FIG. 6B, a search route is generated to the target node N30 using the second method with each link employing the second cost value. As shown in FIG. 6C, after the first route is calculated and the vehicle has reached the first target node, a second target node N32 is selected as another of the critical nodes, and the previous target node N30 is selected as a second starting node N34. FIG. 4D illustrates a search route from the second starting node N34 to the new target node N32.

Figure 7A:
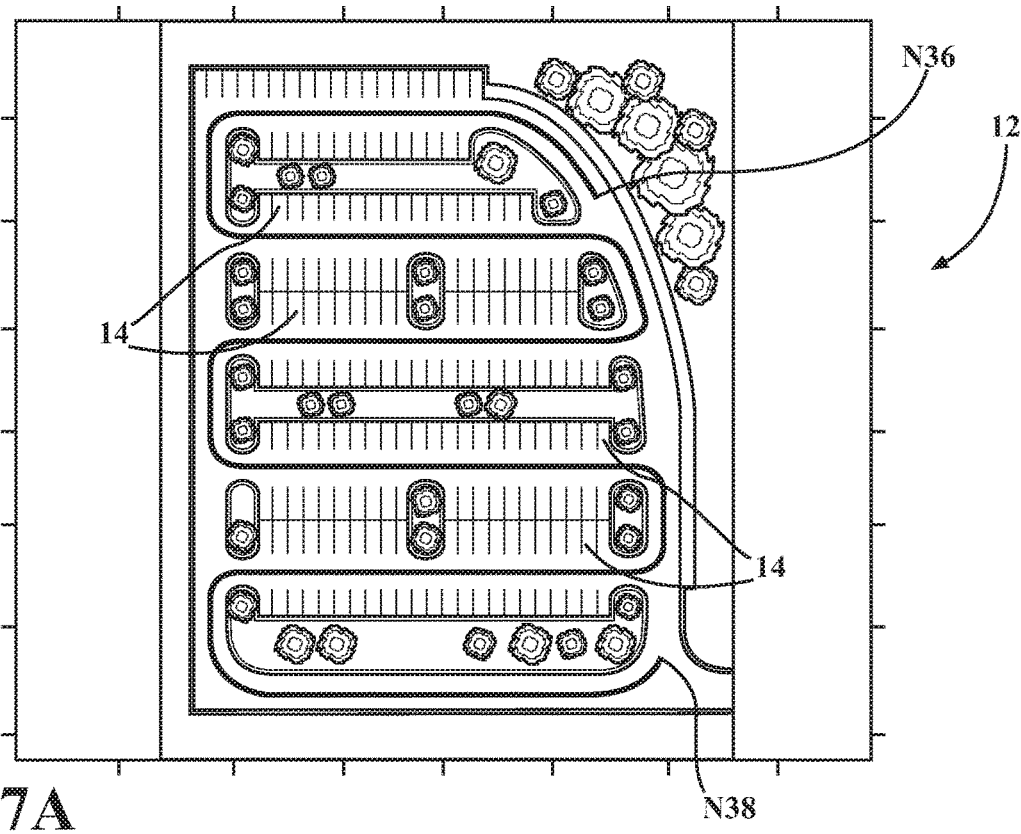
FIG. 7A is a top schematic view of a third example topological map of a parking area illustrating the generation of a route in accordance with the second method.
Figure 7B:
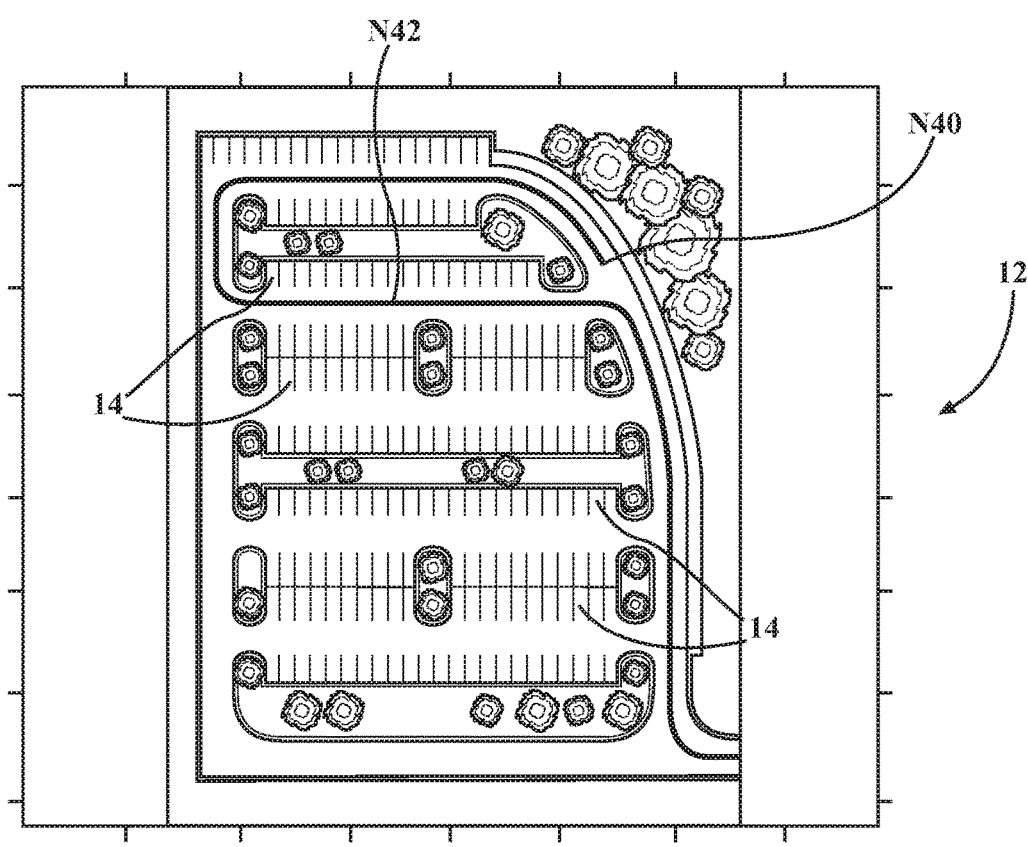
FIG. 7B is a top schematic view of the third example topological map of a parking area illustrating the generation of a rout in accordance with the first method.

FIG. 7A illustrates another example parking area 12 in which the second method 26 was utilized to generate a route to cover a maximum number of parking spaces between a starting node N36 and a target node N38. FIG. 7B illustrates an example parking area 12 in which the first route was utilized to calculate the fastest route between a starting node N40 and a target node N42.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A method for identifying a route within a parking area for a vehicle with a vehicle computer, comprising:
    generating a topological map of a parking area having a plurality of parking spaces and a plurality of roads extending between and adjacent to the parking spaces;
    establishing a plurality of nodes on the topological map, wherein the nodes are located along the plurality of roads of the parking area, and wherein each of the nodes has latitude and longitudinal coordinates;
    establishing a plurality of links on the topological map, wherein the links each extend between two of the nodes, and wherein at least one of the links extends along a plurality of the parking spaces of the parking area;
    wherein each of the links has a length determined by the latitude and longitudinal coordinates of the nodes which comprise the link;
    establishing one of the nodes as a starting node at which the vehicle starts and establishing one of the nodes as a target node; and
    establishing a route from the starting node to the target node that follows a series of the links to the target node using Dijkstra's algorithm;
    wherein a cost associated with each link for purposes of establishing the route with Dijkstra's algorithm is based on the equation:

$$\text{Cost} = \text{Adjacency} + f(\text{LinkLength}/\text{ParkingSpaces})$$

wherein any of the links that have a non-zero number of parking spaces are non-zero links, and wherein Adjacency of the non-zero links is zero;
    wherein any of the links that have zero parking spaces are zero links, and wherein the Adjacency of the zero links is equal to a sum of the number of zero links between a subject zero link of the zero links and a closest non-zero link of the non-zero links;
    wherein f(LinkLength/ParkingSpaces) for zero links is a predetermined constant; and
    wherein f(LinkLength/ParkingSpaces) for non-zero links is equal to the length of the link divided by a number of parking spaces that border the link.

2. The method as set forth in claim 1 wherein the predetermined constant is five.

3. The method as set forth in claim 1 wherein the nodes are each located at one of: where a road lane starts forming, where a forming road lane finishes forming, where a road lane begins merging, where a merging road lane finishes merging, where a road approaches an intersection where multiple vehicle maneuvers are possible from at least one lane of the road in either direction, where the link length is greater than two kilometers, or at a parking space.

4. The method as set forth in claim 1 wherein the target node is one of a plurality of critical nodes, and wherein the critical nodes are each located at a corner of the parking area.

5. The method as set forth in claim 4 wherein after the route to the target node is established, the method continues with establishing a second target node, wherein the second target node is another of the critical nodes, and the method continues with establishing a route to the second target node that follows a series of the links to the second target node using Dijkstra's algorithm.

6. The method as set forth in claim 1, wherein the vehicle is a self-driving vehicle and the method further includes propelling the self-driving along the established route.

7. The method of claim 1 further including displaying the established route on the electronic display of the vehicle such that the vehicle may follow the established route.

8. A non-transitory computer-readable storage media in a vehicle computer storing computer-executable instructions that, when executed by a processor, instruct a device to perform actions to identify a route within a parking area for the vehicle, the actions comprising:
    generating a topological map of a parking area, the topological map having a plurality of parking spaces and a plurality of roads extending between and adjacent to the parking spaces;
    displaying the topological map on an electronic display of the vehicle;
    establishing a plurality of nodes on the topological map, wherein the nodes are located along the plurality of roads, and wherein each of the nodes has latitude and longitudinal coordinates;
    establishing a plurality of links on the topological map, wherein the links each extend between two of the nodes, and wherein at least one of the links extends along a plurality of the parking spaces;
    wherein each of the links has a length determined by the latitude and longitudinal coordinates of the nodes which comprise the link;
    establishing one of the nodes as a starting node at which a vehicle starts and establishing one of the nodes as a target node; and
    establishing a route to the target node that follows a series of the links to the target node using Dijkstra's algorithm;

wherein a cost associated with each link for purposes of establishing the route with Dijkstra's algorithm is based on the equation:

Cost=Adjacency+$f$(LinkLength/ParkingSpaces)

wherein any of the links that have a non-zero number of parking spaces are non-zero links, and wherein Adjacency of the non-zero links is zero;
wherein any of the links that have zero parking spaces are zero links, and wherein the Adjacency of the zero links is equal to a sum of the number of zero links between a subject zero link of the zero links and a closest non-zero link of the non-zero links;
wherein f(LinkLength/ParkingSpaces) for zero links is a predetermined constant;
wherein f(LinkLength/ParkingSpaces) for non-zero links is equal to the length of the link divided by a number of parking spaces that border the link; and
displaying the established route on the electronic display such that the vehicle may follow the established route.

9. The non-transitory computer-readable storage media storing computer-executable instructions as set forth in claim 8, wherein the predetermined constant is five.

10. The non-transitory computer-readable storage media storing computer-executable instructions as set forth in claim 8, wherein the nodes are each located at one of: where a road lane starts forming, where a forming road lane finishes forming, where a road lane begins merging, where a merging road lane finishes merging, where a road approaches an intersection where multiple vehicle maneuvers are possible from at least one lane of the road in either direction, where a link length is greater than two kilometers, or at a parking space.

11. The non-transitory computer-readable storage media storing computer-executable instructions as set forth in claim 8, wherein the target node is one of a plurality of critical nodes, and wherein the critical nodes are each located at a corner of the parking area.

12. The non-transitory computer-readable storage media storing computer-executable instructions as set forth in claim 11, wherein after the route to the target node is established, and wherein the instructions, when executed by the processor, further include establishing a second target node, wherein the second target node is another of the critical nodes, and the method continues with establishing a route to the second target node that follows a series of the links to the second target node using Dijkstra's algorithm.

13. The non-transitory computer-readable storage media storing computer-executable instructions as set forth in claim 8, wherein the vehicle is a self-driving vehicle, and wherein the non-transitory computer-readable storage media storing computer-executable instructions are further configured to instruct the self-driving vehicle to drive along the established route.

14. A vehicle including a vehicle computer and an electronic display, the vehicle computer configured to identify a route within a parking area having a plurality of parking spaces for a vehicle, the vehicle computer comprising control circuitry configured to:
display a topological map on the electronic display of the vehicle;
establish a plurality of nodes on the topological map, wherein the nodes are located along a plurality of paths extending between and adjacent to the parking spaces, and wherein each of the nodes has latitude and longitudinal coordinates;
establish a plurality of links on the topological map, wherein the links each extend between two of the nodes, and wherein at least one of the links extends along at least one of the plurality of parking spaces;
establish a first node of the plurality of nodes as a starting node at which the vehicle starts and establishing a second node of the plurality nodes as a target node;
establish a route from the starting node to the target node that follows a series of at least a portion of the plurality of links to the target node using Dijkstra's algorithm; and
display the established route on the electronic display such that the vehicle may follow the established route;
wherein a cost associated with each link for purposes of establishing the route with Dijkstra's algorithm is based on the equation:

Cost=Adjacency+$f$(LinkLength,ParkingSpaces)

wherein any of the links that are associated with a non-zero number of parking spaces are non-zero links, and wherein an Adjacency of the non-zero links is zero;
wherein any of the links that are associated with zero parking spaces are zero links, and wherein the Adjacency of the zero links is based on a number of zero links between a subject zero link of the zero links and a closest non-zero link;
wherein f(LinkLength, ParkingSpaces) for zero links is a predetermined constant; and
wherein f(LinkLength, ParkingSpaces) for non-zero links is a function of a length of the subject non-zero link and a number of parking spaces that border the link.

15. The vehicle as set forth in claim 14, wherein the vehicle is a self-driving vehicle and wherein the control circuitry of the computer is further configured to provide instructions to propel the self-driving vehicle along the established route.

* * * * *